United States Patent [19]
Pettersson

[11] Patent Number: 5,769,561
[45] Date of Patent: Jun. 23, 1998

[54] LEVELLING HEAD

[75] Inventor: Björn Pettersson, Järfalla, Sweden

[73] Assignee: System 3R International AB, Vällingby, Sweden

[21] Appl. No.: 637,268

[22] Filed: Apr. 25, 1996

[30] Foreign Application Priority Data

Apr. 26, 1995 [DE] Germany ........................ 195 14 851.7

[51] Int. Cl.[6] ...................................................... B25G 3/36
[52] U.S. Cl. .............................. 403/393; 403/3; 403/380; 403/389; 269/47; 269/309; 267/137
[58] Field of Search ............................. 403/393; 269/47, 269/52, 309; 267/75, 137, 158, 160; 279/74; 219/1, 69.1

[56] References Cited

U.S. PATENT DOCUMENTS

| | | | |
|---|---|---|---|
| 3,112,116 | 11/1963 | Seitz | 269/52 |
| 3,563,526 | 2/1971 | Mui | 263/178 |
| 3,565,416 | 2/1971 | Williamson | 269/47 |
| 3,578,799 | 5/1971 | Davis | 269/52 X |
| 3,886,349 | 5/1975 | Arai | 240/41 L |
| 3,942,780 | 3/1976 | Clement | 269/47 |
| 4,598,453 | 7/1986 | Wills | 269/47 X |
| 4,602,797 | 7/1986 | Morawski et al. | 279/1 DC |
| 4,944,626 | 7/1990 | Dommer et al. | |
| 4,968,122 | 11/1990 | Hlousek et al. | 350/500 |
| 5,119,915 | 6/1992 | Nelson | 267/158 X |
| 5,308,050 | 5/1994 | Schroder | 269/309 |
| 5,415,384 | 5/1995 | Obrist et al. | 269/309 |

FOREIGN PATENT DOCUMENTS

| | | |
|---|---|---|
| 780871 | 8/1957 | United Kingdom . |
| 2 194 074 | 2/1988 | United Kingdom . |

*Primary Examiner*—Kenneth J. Dorner
*Assistant Examiner*—Bruce A. Lev
*Attorney, Agent, or Firm*—Jacobson, Price, Holman & Stern, PLLC

[57] ABSTRACT

A leveling device with which to orient a workpiece—or tool—affixing upper part relative to a lower part connected to it, the device having at least one adjusting screw of which the shank rotatably passes through the upper part and engages a thread in the lower part. To permit economical manufacture of the device without degradation in accuracy, the invention anchors the upper part in the lower part at a specified spring loading and at a spaced apart distance from the adjusting screw.

18 Claims, 4 Drawing Sheets

LEVELLING HEAD

The invention relates to a device for adjusting a workpiece- or tool-affixing upper part relative to a lower part connected thereto, the device including at least one adjusting screw having a shank that rotatably passes through the upper part and engages a thread present in the lower part.

Such a leveling device for an upper part, sometimes called a swinging head, is known in precision mechanics, whereby a work piece or tool affixed to the upper part can be oriented accurately into a desired position relative to a coordinate system stationary within the machine. However operation of such devices are cumbersome and their manufacture is costly.

The object of the invention is to so design a leveling device that may be manufactured more economically without degradation of accuracy.

The invention solves this problem in that the upper part is anchored in is specified manner in the lower part. With lateral play from the adjusting screw. Thereby the setting accuracy of the upper part relative to the typically machine-stationary lower part may be as high as about $1\mu$ by rotating the adjusting screw by one revolution or less. Moreover the manufacture of the device of the invention can be substantially simplified in this manner relative to the manufacture of related devices of the prior art.

Preferred embodiments of the invention are described, such as pre stressing, i.e. Spring-loading, implemented by the upper part being permanently anchored by a bolt in the lower part, a spring being clamped around the bolt and being held between the upper and lower parts. This spring may suitably be composed of one or more stacks of Belleville springs, and in such a case the individual stacks may be mutually prestress ed. It is further recommended that a guide be affixed to the upper and lower parts to constrain an upper-part motion about an axis perpendicular to the connection line between the adjusting screw and the bolt when the adjusting screw is being set. In this manner the adjustment motion of the upper part is defined about an axis typically related in the above cited manner to the machine axis. Appropriately the guide will be in the form of a spring-steel plate having first and second segments inserted between the upper and lower parts and affixed at least by one of its first segments to the lower part and at least by one of its second segments to the upper part. The spring-steel plate suitably evinces, or defines, the shape of a cross of which the mutually opposite ends comprise two first segments and two second segments respectively. In such a design the bolt may then be mounted advantageously in the vicinity of the first segment of the steel-spring plate and the adjusting screw in the vicinity of the other first segment which is spaced apart.

In an especially preferred further embodiment of the invention, two pairs each comprising one adjusting screw and one bolt are used to orient the upper part perpendicularly to two coplanar axes, each pair of adjusting screw and bolt being mounted symmetrically to one of the axes while itself located on the other axis. Thereby the upper part is oriented relative to the plane subtended by the x and y axes by merely rotating the two adjusting screws. The upper part may comprise a fitting above the lower part and projecting to one side for the purpose of orienting or aligning the tool or workpiece, the fitting including a borehole or similar means to affix the tool or workpiece to the upper part. In such case it will be especially appropriate that one of the bolts be near the fitting. Further the lower part may be fitted at its lower side in particular with a dovetailed precision guide which if desired may include a clamp to tighten the lower part to a dovetail machine-guide.

The invention applies in particular to orienting a tool affixed directly to the upper part or where called for using accessories such as a head stock, where the tool then may be worked by spark erosion through an electrical discharge machine ("EDAM") according to a predetermined pattern.

The invention is described in detail below in relation to the illustrative embodiment shown in the attached drawings.

DESCRIPTION OF THE PREFERRED EMBODIMENT(S)

Figure 2:
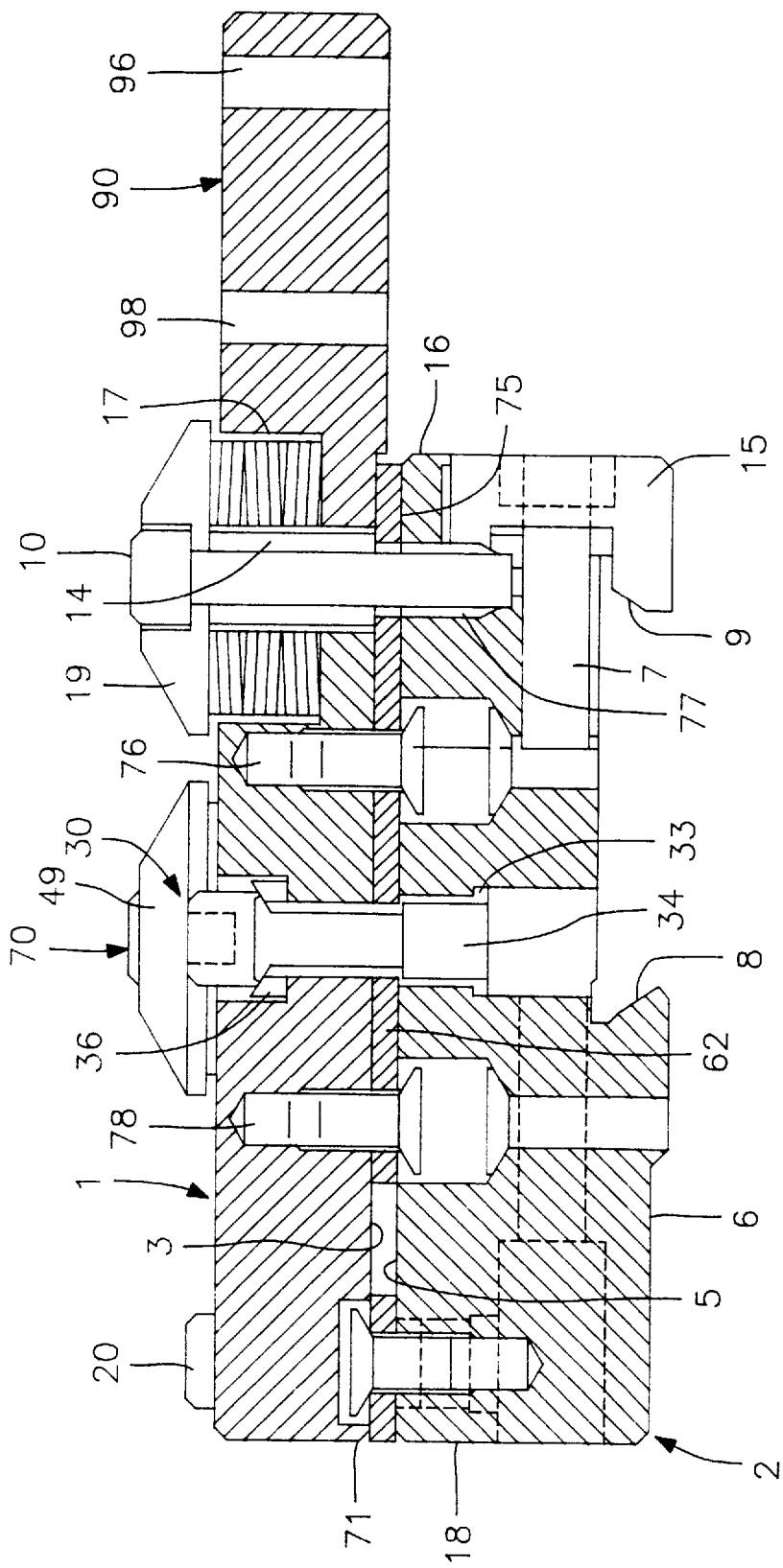
FIG. 2 is an elevation of a section along the line A—A of FIG. 1.
Figure 3:
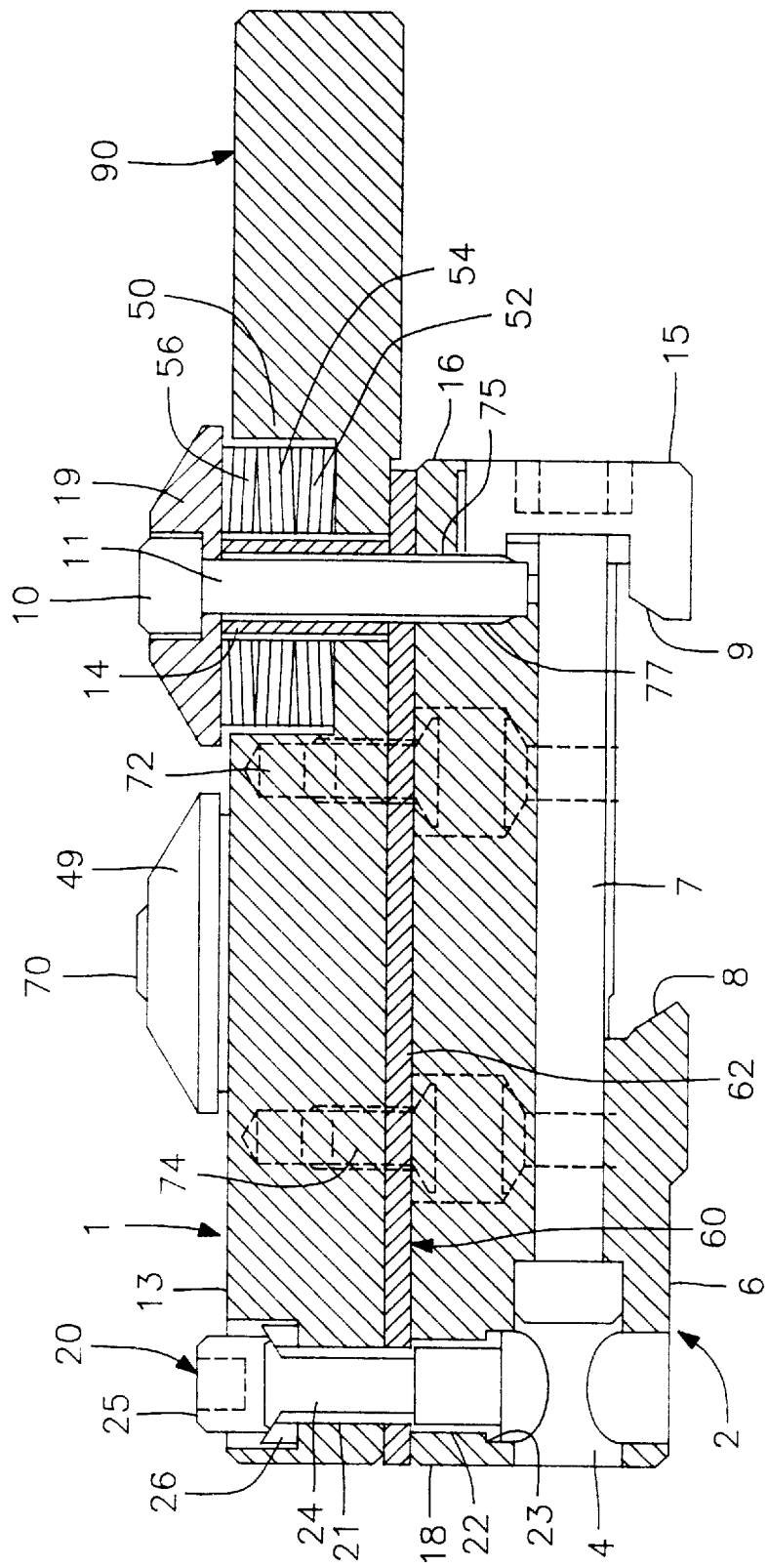
FIG. 3 is an elevation of a section along line B—B of FIG. 1.
Figure 4:
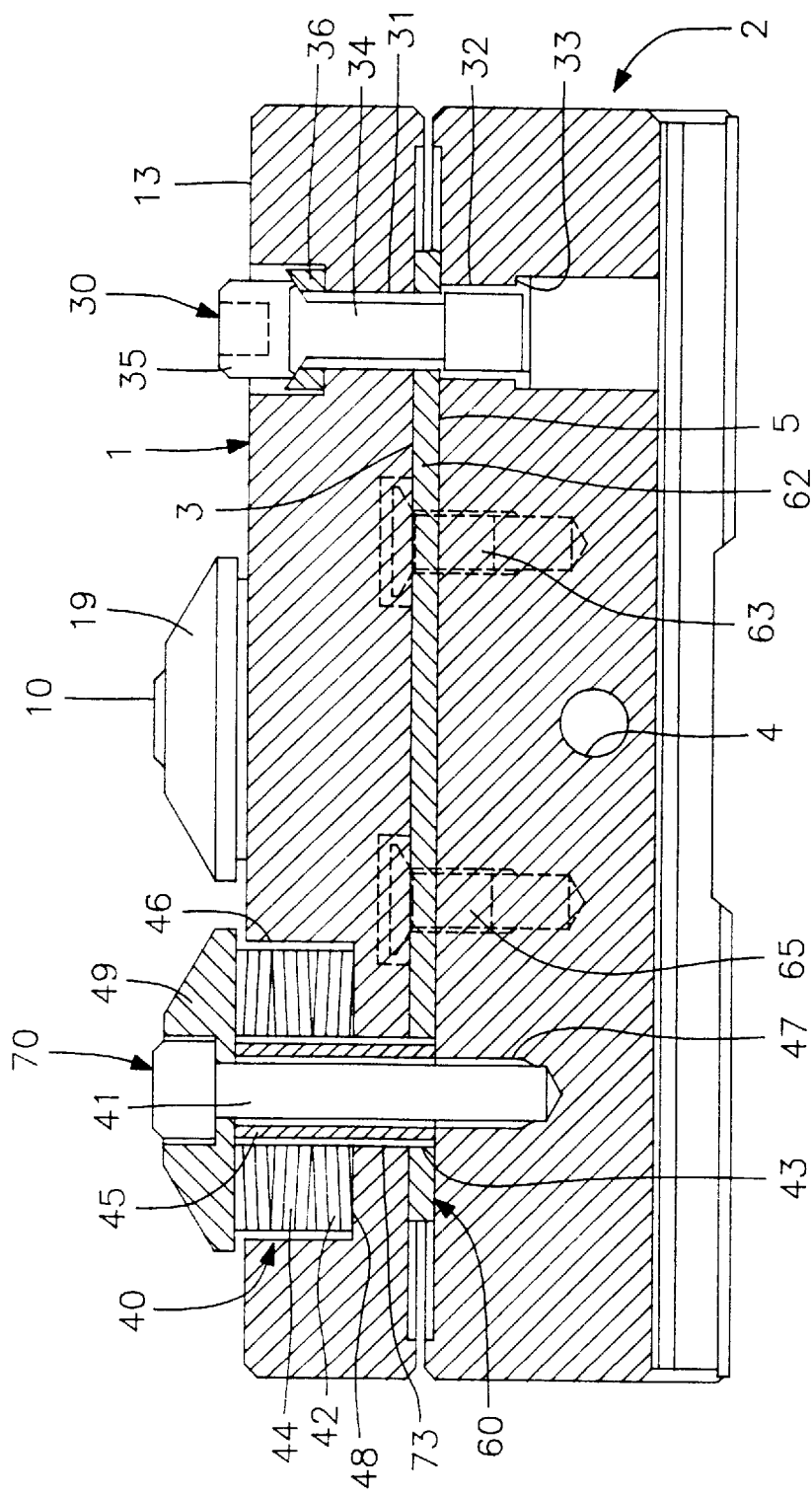
FIG. 4 is an elevation of a section along line C—C of FIG. 1.

As shown by FIGS. 2 and 3, the lower part 2 of the leveling device of the as invention is composed of a solid and substantially rectangular block of tool steel which includes a dovetail channel running parallel to a side surface 16 and including a slope 8 in its essentially planar lower side 6. A clamp piece 15 is detachable held by a clamping bolt 7 in a clearance of the lower part 2 along the side surface 16, the shank of the bolt passing through a continuous borehole 4 in the lower part 2 running near the lower side 6 and perpendicularly to the side surface 16 in the lower part 2, wherein the bolt engages an inside thread in the clamping piece 15. Opposite the dovetailed surface 8 of the lower part 2, the clamping piece 15 comprises a further and suitably oppositely slanted dovetail surface 9. The head of the clamping bolt 7 is sunk into the lower part 2 and is externally accessible through a duct or channel, whereby the lower part 2 can be clamped in an unambiguous fixed manner to a matching or complementary dovetail configuration, for instance one which is present at a spark erosion machine against the lower part 2, by means of the clamping bolt 7.

Figure 1:
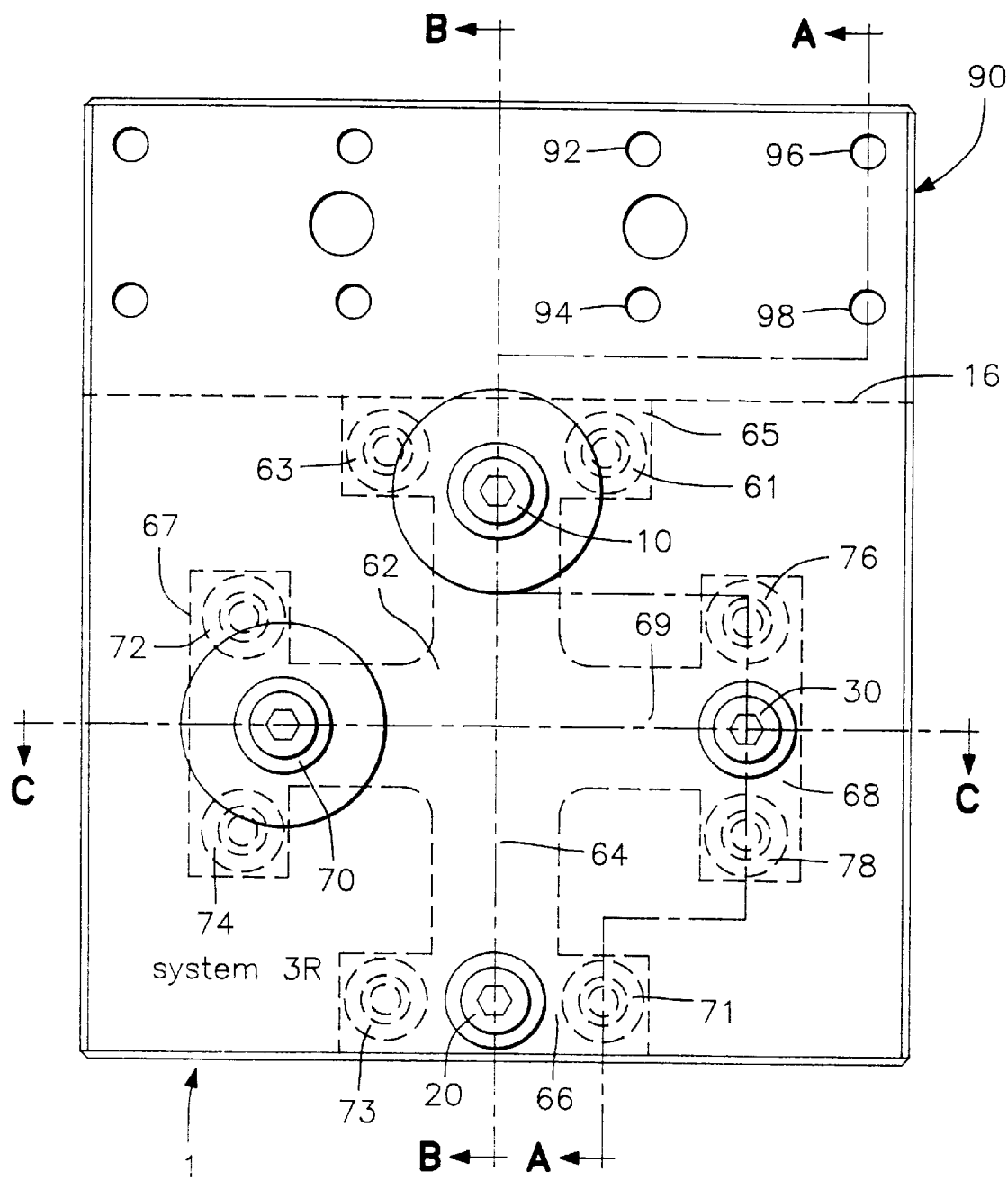
FIG. 1 is a top view of the upper part of a leveling device having the characteristics of the invention.

A guide denoted overall by 60 and in the form of a spring-steel plate 62 only a few mm thick is screwed onto the substantially planar surface 5 of the lower part 2, the cuneiform outline of the plate 62 being shown in broken lines in the top view of FIG. 1. The steel spring plate 62 comprises two mutually opposite first segments 65, 66 each at one end of the cross and each being configured as an extension. The first segment 65 is located near the side surface 16 (shown in dashed lines in FIG. 1) of the lower part 2 and is affixed by mutually spaced screws 61, 63 to the surface 5 of the lower part 2. The opposite first segment 66 is near the side surface 18 opposite side surface 16 of the lower part 2 and is affixed by two mutually spaced screws 71, 73 to the surface 5.

Except for a fitting 90 yet to be discussed, the top view dimensions (FIG. 1) of the upper part 1 of the leveling device of the invention are the same as those of the lower part 2 to which the upper part 1 is connected through the steel-spring plate 62. The steel-spring plate 62 comprises two mutually opposite second segments 67, 68 in the form of laterally widened ends of the other cross beam of the cuneiform steel-spring plate 62. A second segment 67 is affixed by screws 72, 74 and the opposite second segment is affixed by screws 76, 78 to the substantially planar lower surface 3 of the upper part 1 near the lower part 2.

The steel-spring plate 62 includes a hole 75 in the segment 65 to pass a bolt 10. The bolt engages a threaded blind hole 77 in the lower part 2. The upper part 1 comprises a continuous borehole 12 aligned with the threaded blind hole 77 and radially widened near the lower surface 3 opposite the threaded blind hole 77 and the borehole 75 to receive a bush, or bushing, 14 enclosing the shank 11 of the bolt 10. The bush 14 rests on the top side of the spring-steel plate 62 onto which it is permanently anchored by a cap 19 covering it while also receiving the head of the bolt. From the top side 13 of the upper part 1, the continuous borehole 12 flares radially toward, i.e. Defines, a cylindrical chamber 17 receiving three mutually stressed stacks of Belleville springs. The stacks of Belleville springs 52, 54, 56 engage by their outer contours the cylindrical sidewall of the chamber 17 while resting at their inner contours against the bush 14.

As the configuration is described above and as shown in FIGS. 2 and 3, the upper part 1 remains slightly displaccable at this location against the force of the spring 50 (composed of three stacks 52, 54, 56 of Belleville springs) relative to the lower part 2 even when the bolt 10 has been tightened hard.

A bolt 70 corresponding to the bolt 10 passes through the upper part 1 and the second segment 67 of the spring-steel plate 62 into a threaded blind hole 47 in the lower part 2. The shank 41 of the bolt 70 is enclosed by a bush, or bushing, 45 passing through a borehole 73 of the upper part 2 aligned with the threaded blind hole 47 and through an aperture 43 in the spring-steel plate 62 and resting on the surface 5 of the lower part 2. A cap 49 receiving the head of the bolt 70 covers the external end of the bush 45 as well as a chamber 48 (which is a radial extension of the borehole 73) open toward the top side 13 in the upper part 1, said chamber receiving a spring 40 in the form of three mutually stressed stacks of Belleville springs 42, 44, 46. The disk-spring stacks 42, 44, 46 by their external sides engage the cylindrical chamber wall while by their inner walls they rest against the external surface of the bush 45. As a result, even when the bolt 70 is tightened hard, the upper part 1 is slightly displaccable in the bolt's vicinity against the action of the spring 40, and indeed it is displaccable together with the segment 67 of the spring-steel plate.

A continuous borehole 21 perpendicular to the lower surface 3 (FIG. 3) is present in the upper part 1 approximately at the middle of the first segment 66 and is aligned with a continuous borehole 22 in the lower part 2. A threaded inset 23 is press-fitted from below into the borehole 22 and is engaged by the outer thread of the shank 24 of an adjusting screw 20. The head 25 of the adjusting screw 20 is at least partly seated in a widening, open toward the top side 13, of the borehole 21 and is supported by a hard-metal ring 26.

Another adjusting screw 30 is present approximately at the center of the is segment 68 and comprises a shank 34 passing through a continuous borehole 31 in the upper part 1, perpendicularly to the lower surface 3, and also through a continuous borehole 32 in the lower part 2 which is aligned with the said borehole 31, said adjusting screw 32 engaging a threaded inset 33 fitted from below into the continuous borehole 32. The head 35 of the adjusting screw 30 is at least partly seated in a widening of the borehole 31 which is open toward the top side 13 and is supported by a hard-metal ring 36.

The adjusting screw 20 and the bolt 10 are mutually spaced apart along a center line 64 of the cuneiform spring-steel plate 62 on which they are mounted symmetrically to the transverse center line 69 of the spring-steel plate 62. The adjusting screw 30 and the bolt 70 are correspondingly spaced along the center line 69 on which they are mounted symmetrically to the center line 64. Moreover the screws 61 and 63 are mounted on either side of the center line and their connecting line is transverse to it. Similar conditions apply to the pair of screws 71, 73. The same spatial relationships hold for the pairs of screws 72, 74 and 76, 78 regarding the center line 69.

The spring 50 implements mutually pre stressing of the upper and lower parts 1 and 2 respectively and by means of the hard-metal ring 26 forces the upper part 1 against the head of the adjusting screw 20. In corresponding manner the spring 40 imparts pre stressing to the upper part 1 whereby this upper part 1 is forced by means of the hard-metal ring 36 against the head of the adjusting screw 30. By rotating in or out the adjusting screw 20 and/or the adjusting screw 30 by a few revolutions or merely by a fraction of a revolution, the position of the upper part 1 relative to the lower part 2 can be accurately oriented with a resolution of about $1\mu$ in relation to the machine axes which run parallel to the center lines 64 and 69.

The upper part 1 is equipped with a fitting 90 projecting beyond the side surface 16 for the purpose of affixing a workpiece or a tool, the fitting 90 comprising several continuous boreholes for affirmation in the upper part 1.

I claim:

1. A device for mounting a tool or workpiece to a machine, the device comprising an upper part including a means for affixing a tool or workpiece to said upper part, a plate attached to said upper part, a lower part attached to said plate, two adjusting screws each having a shank rotatably passing through a bore in said upper part and engaging a threaded fitting within said lower part, and at least one bolt extending between said upper part and said lower part with a spring clamped around said bolt, wherein one of said two adjusting screws lies along a first center line of said plate and the other of said two adjusting screws lies along a second center line of said plate, said first and second center lines of said plate perpendicular to each other.

2. A device as claimed in claim 1 wherein said upper part comprises a planar lower surface and said lower part comprises a planar top surface, said lower and top surfaces running substantially parallel to each other.

3. A device a claimed in claim 2, wherein each of said adjusting screws is oriented substantially perpendicularly to said lower surface.

4. A device as claimed in claim 1, wherein said at least one bolt includes a bolt shank extending through said upper part and permanently anchored to said lower part, and wherein said spring includes at least one prestress ed spring being mounted about said bolt shank for spring biasing said upper part relative to said lower part.

5. A device as claimed in claim 4 wherein said spring is composed of a plurality of mutually stressed stacks of springs.

6. A device as claimed in claim 1, wherein said plate comprises a spring-steel plate disposed between the upper part and the lower part.

7. A device as claimed in claim 1 wherein said means for affixing comprises a fitting projecting to one side beyond said lower part and comprising boreholes for affixing a workpiece or a tool to said upper part.

8. A device as claimed in claim 7, wherein said at least one bolt is disposed near said fitting.

9. A device as claimed in claim 1, wherein said lower part includes a guide having a cross-section in the shape of a dovetail at a bottom surface of said lower part.

10. A device as claimed in claim 9, wherein said guide includes a clamping means for clamping said lower part to a machine.

11. A device as claimed in claim 1, wherein said plate generally assumes the shape of a cross comprising at its mutually opposite ends two first segments and two second segments respectively, each of said first and second segments extending from said ends.

12. A device as claimed in claim 1, wherein said at least one bolt is mounted in the vicinity of one of said two first segments of said plate and one of said two adjusting screws is mounted in the vicinity of the other of said two first segments of said plate.

13. A device for mounting a tool or workpiece to a machine, the device comprising an upper part including a means for affixing a tool or workpiece to said upper part, a lower part connected to said upper part, at least one adjusting screw having a shank rotatable passing through a bore in said upper part and engaging a threaded fitting within said lower part, anchoring means for anchoring said upper part to said lower part at a predetermined spring loading relative to said lower part, said anchoring means spaced apart from said adjusting screw and including a bolt having a bolt shank extending through said upper part and permanently anchored to said lower part, at least one prestress ed spring being mounted about said bolt shank for spring biasing said upper part relative to said lower part, a guide means disposed between, and affixed to, said lower part and said upper part for constraining motion of said upper part about an axis perpendicular to a line extending between said adjusting screw and said bolt during rotation of said adjusting screw wherein said guide means comprises a spring-steel plate disposed between the upper part and the lower part and affixed to said upper part and said lower part, wherein said spring-steel plate generally assumes the shape of a cross comprising at its mutually opposite ends two first segments and two second segments respectively, each of said first and second segments extending from said ends.

14. A device as claimed in claim 13, wherein said bolt is mounted in the vicinity of one of said two first segments of said spring-steel plate and said adjusting screw is mounted in the vicinity of the other of said two first segments located at the opposite end of the cross-shaped plate.

15. A device for mounting a tool or workpiece to a machine, the device comprising an upper part including a means for affixing a tool or workpiece to said upper part, a lower part connected to said upper part, at least one adjusting screw having a shank rotatable passing through a bore in said upper part and engaging a threaded fitting within said lower part, anchoring means for anchoring said upper part to said lower part at a predetermined spring loading relative to said lower part, said anchoring means spaced apart from said adjusting screw and including a bolt having a bolt shank extending through said upper part and permanently anchored to said lower part, at least one prestress ed spring being mounted about said bolt shank for spring biasing said upper part relative to said lower part, wherein said spring comprises at least one stack of disk-springs enclosing the bolt shank, said disk-springs having an outer periphery, said outer periphery of said disk-springs fixedly anchored into said upper part, said disk-springs having an inner periphery, said inner periphery anchored with respect to said lower part, wherein said bolt shank is enclosed by a bushing affixed to said lower part and to which the inner periphery of said stack of disk-springs is anchored.

16. A device as claimed in claim 15 wherein said stack of disk-springs is housed in a recess within said upper part.

17. A device as claimed in claim 16, wherein said recess within said upper part is covered by a cap linked to said bolt.

18. A device for mounting a tool or workpiece to a machine, the device comprising an upper part including a means for affixing a tool or workpiece to said upper part, a lower part connected to said upper part, at least one adjusting screw having a shank rotatable passing through a bore in said upper part and engaging a threaded fitting within said lower part, anchoring means for anchoring said upper part to said lower part at a predetermined spring loading relative to said lower part, said anchoring means spaced apart from said adjusting screw and including a bolt having a bolt shank extending through said upper part and permanently anchored to said lower part, at least one prestress ed spring being mounted about said bolt shank for spring biassing said upper part relative to said lower part, a guide means disposed between, and affixed to, said lower part and said upper part for constraining motion of said upper part about an axis perpendicular to a line extending between said adjusting screw and said bolt during rotation of said adjusting screw wherein said guide means comprises a spring-steel plate disposed between the upper part and the lower part and affixed to said upper part and said lower part, wherein said adjusting screw and said bolt are disposed symmetrically to a first center line of said plate, and further comprising a second adjusting screw and a second bolt each passing through said upper part and connected to said lower part in the same manner as said adjusting screw and said bolt respectively, said second adjusting screw and second bolt disposed symmetrically to a second center line of said plate, said second center line perpendicular to said first center line.

* * * * *